May 12, 1936.  F. STRECKER  2,040,280
METHOD OF COPYING LENTICULATED FILMS
Filed Sept. 23, 1932
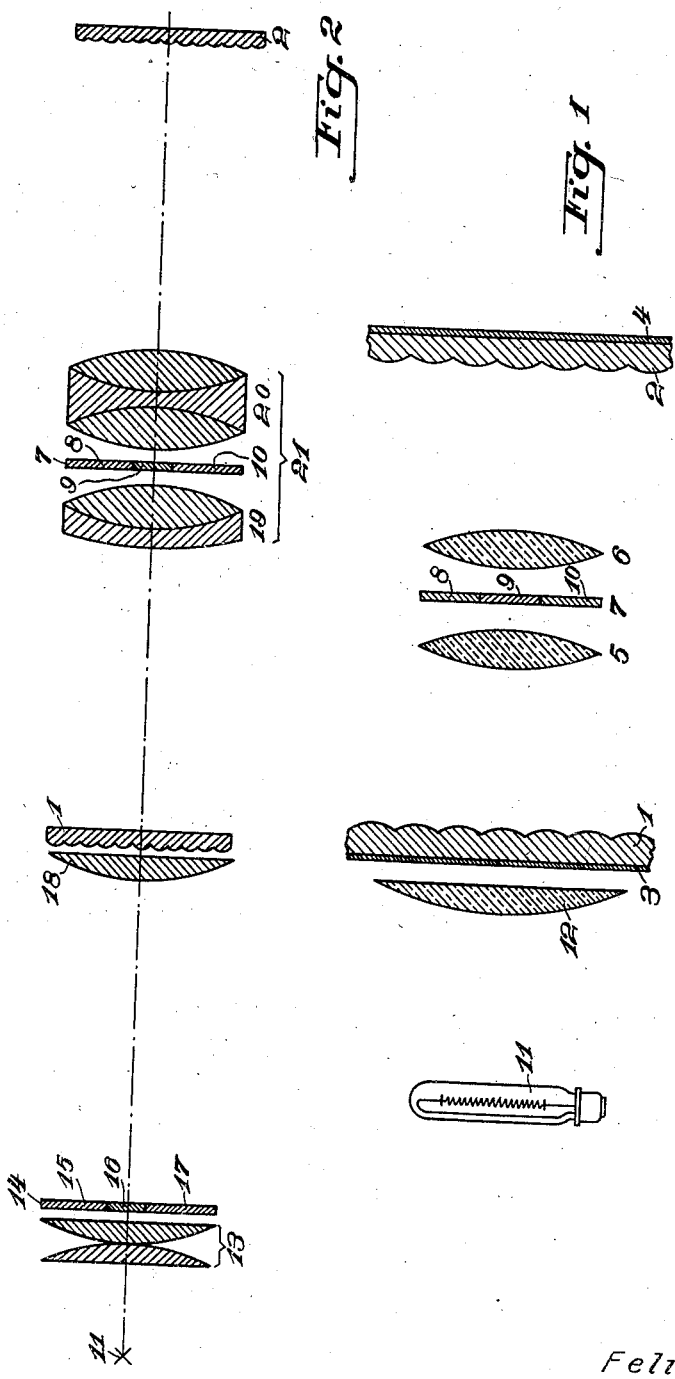
INVENTOR
Felix Strecker
BY
ATTORNEYS Patented May 12, 1936

2,040,280

UNITED STATES PATENT OFFICE 2,040,280

METHOD OF COPYING LENTICULATED FILMS

Felix Strecker, Berlin-Siemensstadt, Germany, assignor to Siemens & Halske, Aktiengesellschaft, Siemensstadt, near Berlin, Germany, a corporation of Germany Application September 23, 1932, Serial No. 634,528
In Germany September 23, 1931

3 Claims. (Cl. 88—24)

This application is a continuation in part of my copending application Ser. No. 600,891.

This invention relates to a method of and devices for copying lenticulated films. An advantage of the new method consists in that in the copying process faults can be corrected, which have been produced during the taking process by the fact that the image portions co-ordinated to the different zones have not the same contrasts.

Another advantage is that in the copying process films can be used whose sensitivity is within a rather narrow range of the visible spectrum materially higher than in other ranges. Hence copies can be made on films the emulsion of which has not been sensitized uniformly by the use of special colouring matters for all the colours of the spectrum.

Further advantages of the invention will be more fully explained with the aid of the figures.

The object of the invention is that the portions of the photographic layer co-ordinated by means of the lenticular elements to the various zones of the taking filter are copied differently and that thereby light of such wave-lengths is chosen that the sensitivity of the emulsions of the copying film is high for the light employed.

The new method can be carried into effect by means of devices which are shown in the figures. The two figures illustrate two devices in section.

Fig. 1 is a sectional diagrammatic view showing one optical system with which the invention may be practised;

Fig. 2 is a view similar to Fig. 1 but showing another optical system.

In Fig. 1 the original film carrying the image to be copied is designated by 1 and the unexposed film on which the image is copied by 2. The photographic layer of the original film has been given the number 3 and the photographic layer of the copying film is marked 4.

Between the two films there is placed an optical system consisting of the two lenses 5 and 6 and the colour filter 7. This colour filter is composed of zones 8, 9, and 10 adjacent to one another. The number of the zones coincides with that of the zones used in the taking process, and it is of course understood that on the emulsion of the original film 1, there will be formed color records corresponding to the zones of the filter, and that the colors of the zones are equal substantially to white light. As for the rest the colour filter and the optical system are so designed that the image of the colour filter viewed from film 1 coincides in situation and size with the image of the colour filter used in the taking process. Correspondingly the filter image viewed from film 2 must coincide with the image of the projecting filter.

In front of the original film, there is a light source 11 and a condenser 12 collecting the light of the light source on the film. The light radiated from the light source is abundant in rays having a wave-length to which the emulsion 4 is extremely reactive. As most of the photographic emulsions are very sensitive to shortwave rays, use is made of a light source which is abundant in such rays.

The zones 8, 9, and 10 of the colour filter 7 have different permeability ranges, which are, however, chosen so that the emulsion is particularly sensitive to the light passing through them. On the use of an ordinary photographic emulsion, the filter can, for instance, be chosen in such a manner, that zone 8 is permeable to blue-green light, zone 9 to visible violet light and zone 10 to invisible ultra-violet light.

Though the photographic emulsions are in general more sensitive to ultra-violet light than to visible light, use can nevertheless be made simultaneously of visible and ultra-violet light, since, in general, the glass lenses employed absorb and decrease the ultra-violet light to a larger extent than the visible light.

If however the zones copied with ultra-violet light should be too much blackened, the filter reactive to ultra-violet light must either be chosen denser or the zone of this filter must be partly covered by a diaphragm. If, on the other hand, the ultra-violet light should be too much weakened by the optical system, which is made of glass, this can be replaced by one of quartz.

The new method permits one to correct faults occurring on the original film by means of the copying process. For even on the use of panchromatic emulsions for taking purposes difficulties are encountered in obtaining the same contrasts for all parts of the photographic layer. The slope of the H- and D-curves of an emulsion is in general different for the different filter colours. If now use is made for the copy of the light of suitable wave-length ranges, it is possible to assimilate the gammas to one another which differ on the original from one another.

For carrying through the new method, it may also be advantageous to subject the image portions corresponding to the various zones of the colour filter to exposures of different duration. The copying process can be carried out in such a manner that, at first, a portion of the zones of filter 7 are covered and only, for instance zone 10 is left permeable. The films are then copied. After having covered zone 10 and opened one or several of the remaining zones, both films are again passed through the copying machine, whereby a time of exposure different from that used in the first copying process may now be chosen. It is also possible to connect two such copying devices in tandem, so as to prevent the films from being passed more than once through the copying machine.

Another device for carrying out the new method has been represented in Fig. 2. The light from the light source 11 is collected by the condenser 13 on the film to be copied. Between condenser and film there is placed the colour filter 14. It consists of three zones 15, 16, and 17. The number and size of the zones is again in accordance with the number and size of the zones of the filter used in the taking process. In order to adapt the size and distance of the filter image viewed from film 1, to the corresponding conditions of the taking process, provision is made for a lens 18 between filter 14 and film 1, in the neighbourhood of this film. Film 1 turns its embossed side towards the source of light, which enables the copies to be materially more pronounced. Between film 1 and the film 2 to be copied, provision is made for the objective 21 consisting of the two lenses 18 and 20 and containing the colour filter 7. This filter consists of the three zones 8, 9 and 10, the permeabilities of these being in accordance with those of the zones 15, 16, and 17 respectively. In the copying process the permeabilities are chosen so as to lie in the range of the highest sensitivity of the emulsion of film 2.

On determining the wave lengths used for copying the different image portions, attention should be paid to the fact that the slope of the H- and D-curves, decisive for the finished image, is under certain circumstances different from the slope of these curves inherent in the production of ordinary takes. The use of the reversing process serving for obtaining direct positives, as well as the great fineness of the lenticulations can give rise to different slopes of the characteristic curves.

I claim as my invention:

1. In copying from an original lenticulated film to a copy lenticulated film, said original film having behind each lenticulation thereof a group of records representing colors corresponding to the different zones of the taking filter, the method which comprises testing the gamma values of the copy film and of the original film, projecting light through the original film to the copy film, between the two films passing the light through a color filter having zones of the same number as in the taking filter, and varying the gamma values of the records formed on the copy film by selecting for the various zones of said copy filter material adapted to transmit only light of the wave lengths that will so modify the gamma value of the copy film emulsion as to give the desired gamma values to the records formed thereon.

2. In copying from an original lenticulated film to a copy lenticulated film, said original film having behind each lenticulation thereof a group of records representing colors corresponding to the different zones of the taking filter, the method which comprises testing the gamma values of the copy film and of the original film, projecting light through the original film to the copy film, between the two films passing the light through a color filter having zones of the same number as in the taking filter, varying the gamma values of the records formed on the copy film by selecting for the various zones of said copy filter material adapted to transmit only light of the wave lengths that will so modify the gamma value of the copy film emulsion as to give the desired gamma values to the records formed thereon, and separately exposing the copy film through the respective zones of the copy filter, whereby the time of such exposures may be varied.

3. In copying from an original lenticulated film to a copy lenticulated film, said original film having behind each lenticulation thereof a group of records representing colors corresponding to the different zones of the taking filter, the method which comprises placing the original and copy films with their lenticulations facing towards a light source, testing the gamma values of the copy film and of the original film, projecting light from said source through the original film to the copy film, and between the light source and the original film and also between the two films passing the light through color filters each having zones of the same number as in the taking filter, and varying the gamma values of the records formed on the copy film by selecting for the various zones of said copy filters material adapted to transmit only light of the wave lengths that will so modify the gamma value of the copy film emulsion as to give the desired gamma values to the records formed thereon.

FELIX STRECKER.